US012112483B2

(12) United States Patent
Grady et al.

(10) Patent No.: US 12,112,483 B2
(45) Date of Patent: *Oct. 8, 2024

(54) SYSTEMS AND METHODS FOR ANATOMIC STRUCTURE SEGMENTATION IN IMAGE ANALYSIS

(71) Applicant: HeartFlow, Inc., Redwood City, CA (US)

(72) Inventors: Leo Grady, Darien, CT (US); Peter Kersten Petersen, Palo Alto, CA (US); Michiel Schaap, Leiden (NL); David Lesage, Redwood City, CA (US)

(73) Assignee: HeartFlow, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/171,915

(22) Filed: Feb. 21, 2023

(65) Prior Publication Data

US 2023/0196582 A1 Jun. 22, 2023

Related U.S. Application Data

(63) Continuation of application No. 17/203,964, filed on Mar. 17, 2021, now Pat. No. 11,610,318, which is a
(Continued)

(51) Int. Cl.
*G06T 7/174* (2017.01)
*G06T 7/00* (2017.01)
(Continued)

(52) U.S. Cl.
CPC ............ *G06T 7/174* (2017.01); *G06T 7/0012* (2013.01); *G06T 7/12* (2017.01); *G06T 7/149* (2017.01);
(Continued)

(58) Field of Classification Search
CPC ......... G06T 7/174; G06T 7/0012; G06T 7/12; G06T 7/149; G06T 2200/04;
(Continued)

(56) References Cited

U.S. PATENT DOCUMENTS 8,073,220 B2 12/2011 Khamene
9,349,178 B1 5/2016 Siemens
(Continued)

FOREIGN PATENT DOCUMENTS

CN 101969852 A 2/2011
CN 105793893 A 7/2016
(Continued)

OTHER PUBLICATIONS

Chen et al.: "Fully-Automatic Branch Labeling of Voxel Vessel Structures", Jan. 1, 2001 (Jan. 1, 2001), Philips Research Laboratories, 10 pages.
(Continued)

*Primary Examiner* — Brandon J Miller
(74) *Attorney, Agent, or Firm* — Bookoff McAndrews, PLLC

(57) ABSTRACT

Systems and methods are disclosed for anatomic structure segmentation in image analysis, using a computer system. One method includes: receiving an annotation and a plurality of keypoints for an anatomic structure in one or more images; computing distances from the plurality of keypoints to a boundary of the anatomic structure; training a model, using data in the one or more images and the computed distances, for predicting a boundary in the anatomic structure in an image of a patient's anatomy; receiving the image of the patient's anatomy including the anatomic structure; estimating a segmentation boundary in the anatomic structure in the image of the patient's anatomy; and predicting, using the trained model, a boundary location in the anatomic
(Continued)

structure in the image of the patient's anatomy by generating a regression of distances from keypoints in the anatomic structure in the image of the patient's anatomy to the estimated boundary.

20 Claims, 3 Drawing Sheets

Related U.S. Application Data continuation of application No. 17/013,922, filed on Sep. 8, 2020, now Pat. No. 10,984,535, which is a continuation of application No. 15/975,197, filed on May 9, 2018, now Pat. No. 10,803,592.

(60) Provisional application No. 62/503,838, filed on May 9, 2017.

(51) Int. Cl.
 G06T 7/12 (2017.01)
 G06T 7/149 (2017.01)
(52) U.S. Cl.
 CPC .......... G06T 2200/04 (2013.01); G06T 2207/10072 (2013.01); G06T 2207/10081 (2013.01); G06T 2207/10088 (2013.01); G06T 2207/10104 (2013.01); G06T 2207/10108 (2013.01); G06T 2207/10132 (2013.01); G06T 2207/20081 (2013.01); G06T 2207/20112 (2013.01); G06T 2207/30004 (2013.01); G06T 2207/30101 (2013.01); G06V 2201/03 (2022.01)
(58) Field of Classification Search
 CPC . G06T 2207/10072; G06T 2207/10081; G06T 2207/10088; G06T 2207/10104; G06T 2207/10108; G06T 2207/10132; G06T 2207/20081; G06T 2207/20112; G06T 2207/30004; G06T 2207/30101; G06V 2201/03
 See application file for complete search history.

(56) References Cited

U.S. PATENT DOCUMENTS

| | | | |
|---|---|---|---|
| 9,652,855 | B2 | 5/2017 | Dai |
| 9,881,410 | B2 | 1/2018 | Abe et al. |
| 9,990,472 | B2 | 6/2018 | Gurcan et al. |
| 10,055,851 | B2 | 8/2018 | Spector et al. |
| 10,803,592 | B2 | 10/2020 | Grady et al. |
| 10,984,535 | B2 | 4/2021 | Grady |
| 2007/0036397 | A1 | 2/2007 | Hamza |
| 2007/0165916 | A1 | 7/2007 | Cloutier et al. |
| 2008/0181481 | A1 | 7/2008 | Hong et al. |
| 2008/0304616 | A1 | 12/2008 | Van Uitert, Jr. et al. |
| 2010/0191124 | A1 | 7/2010 | Prokoski |
| 2011/0190634 | A1 | 8/2011 | Kawagishi et al. |
| 2012/0320055 | A1 | 12/2012 | Pekar et al. |
| 2015/0043799 | A1 | 2/2015 | Zhan et al. |
| 2016/0110879 | A1 | 4/2016 | Garnavi et al. |
| 2017/0061258 | A1* | 3/2017 | Chen ............... G06F 21/84 |
| 2017/0213344 | A1 | 7/2017 | Hong et al. |
| 2018/0276815 | A1 | 9/2018 | Xu et al. |
| 2018/0315188 | A1* | 11/2018 | Tegzes ............... G06T 7/11 |

FOREIGN PATENT DOCUMENTS

| | | |
|---|---|---|
| CN | 106605257 A | 4/2017 |
| JP | 2006246941 A | 9/2006 |
| JP | 2006079196 A | 7/2010 |
| JP | 2018501898 A | 1/2018 |
| JP | 2020520005 A | 7/2020 |

OTHER PUBLICATIONS

Lesage D. et al.: "A review of 3D vessel lumen segmentation techniques: Models, features and extraction schemes", Medical Image Analysis, Oxford University Press, Oxford, GB, vol. 13, No. 6, Dec. 1, 2009, pp. 819-845.
Peng Peng et al.: "A review of heart chamber segmentation for structural and functional analysis using cardiac magnetic resonance imaging", Magnetic Resonance Materials in Physics, Biology and Medicine, Springer, DE, GB, vol. 29, No. 2, Jan. 25, 2016, pp. 155-195.
Leyuan Fang et al.: "Automatic segmentation of nine retinal layer boundaries in OCT images of non-exudative AMD patients using deep learning and graph search", Biomedical Optics Express, vol. 8, No. 5, May 1, 2017, p. 2732.
De Bruyne et al. "Fractional Flow Reserve-Guided PCI for Stable Coronary Artery Disease" The New England Journal of Medicine, Sep. 1, 2014 (p. 1208-1217).
Douglas et al. " 1-Year Outcomes of FFRCT-Guided Care in Patients With Suspected Coronary Disease" Journal of the American College of Cardiology, vol. 68, No. 5, 2016 (p. 435-445).
Douglas et al. "Clinical outcomes of fractional flow reserve by computed tomographic angiography-guided diagnostic strategies vs. usual care in patients with suspected coronary artery disease: the prospective longitudinal trial of FFRCT: outcome and resource impacts study" European Heart Journal, No. 36, 2015 (p. 3359-3367).
Hlatky et al. "Quality-of-Life and Economic Outcomes of Assessing Fractional Flow Reserve With Computed Tomography Angiography" Journal of the American College of Cardiology, vol. 66, No. 21, 2015 (p. 2315-2323).
Koo et al. "Optimal Intravascular Ultrasound Criteria and Their Accuracy for Defining the Functional Significance of Intermediate Coronary Stenoses of Different Locations" JACC: Cardiovascular Interventions, vol. 4, No. 7, 2011 (p. 803-811).
Min et al. "Diagnostic Accuracy of Fractional Flow Reserve From Anatomic CT Angiography" JAMA, vol. 308, No. 12, 2012 (p. 1237-1245).
Norgaard et al. "Diagnostic Performance of Noninvasive Fractional Flow Reserve Derived From Coronary Computed Tomography Angiography in Suspected Coronary Artery Disease" Journal of the American College of Cardiology, vol. 63, No. 12, 2014 (p. 1145-1155).
Pijls et al. "Percutaneous Coronary Intervention of Functionally Nonsignificant Stenosis" vol. 49, No. 21, 2007 (p. 2105-2111).
Tonino et al. "Fractional Flow reserve versus Angiography for Guiding Percutaneous Coronary Intervention" The New England Journal of Medicine, vol. 360, No. 3, 2009 (p. 213-224).
Xiayu Xu et al., "Vessel Boundary Delineation on Fundus Images Using Graph-Based Approach", IEEE Transactions On Medical Imaging, vol. 30, No. 6, Jun. 1, 2011, pp. 1184-1191, XP011325740, ISSN: 0278-0062, DOI: 10.1109/TMI.2010.2103566.
Kerrien E. et al., "Blood vessel modeling for interactive simulation of interventional neuroradiology procedures", Medical Image Analysis, vol. 35, Jan. 2017 (2017), pp. 685-698, XP029801738,ISSN: 1361-8415, DOI:10.1016/J.MEDIA.2016.10.003.
Dong-Goo Kang et al., "Three-Dimensional Blood Vessel Quantification via Centerline Deformation", IEEE Transactions On Medical Imaging, vol. 28, No. 3, Mar. 2009, pp. 405-414, XP011248049, ISSN: 0278-0062.
Olaf Ronneberger et al., "U-Net: Convolutional Networks for Biomedical Image Segmentation", Springer International Publishing, Cham, XP055940098, ISSN: 0302-9743 ISBN: 978-3-030-41298-2 vol. 9351, pp. 234-241, DOI: 10.1007/978-3-319-24574-4_28, Retrieved from the Internet: URL:https://link.springer.com/content/pdf/ 10.1007/978-3-319-24574-4_28.

* cited by examiner

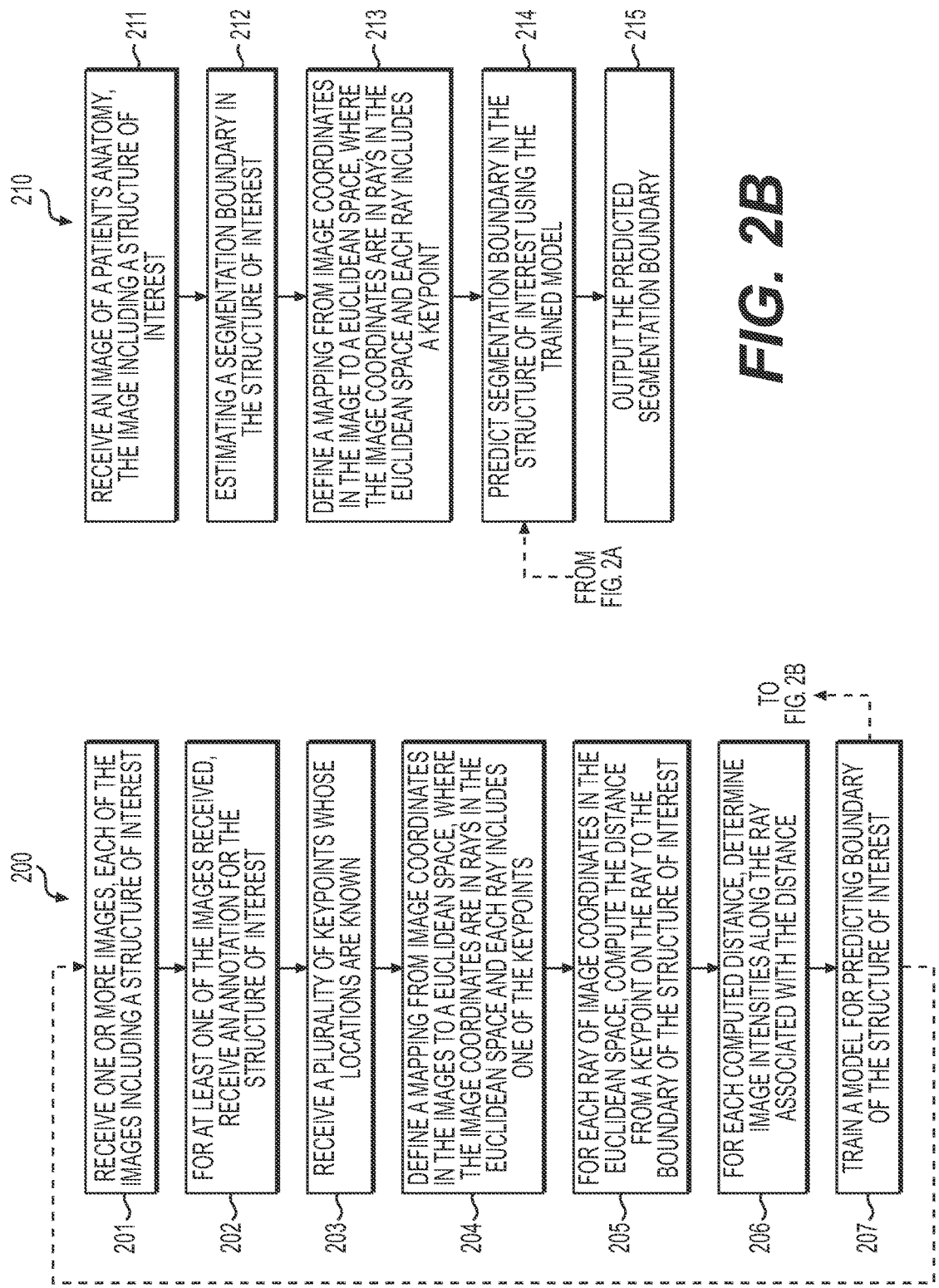

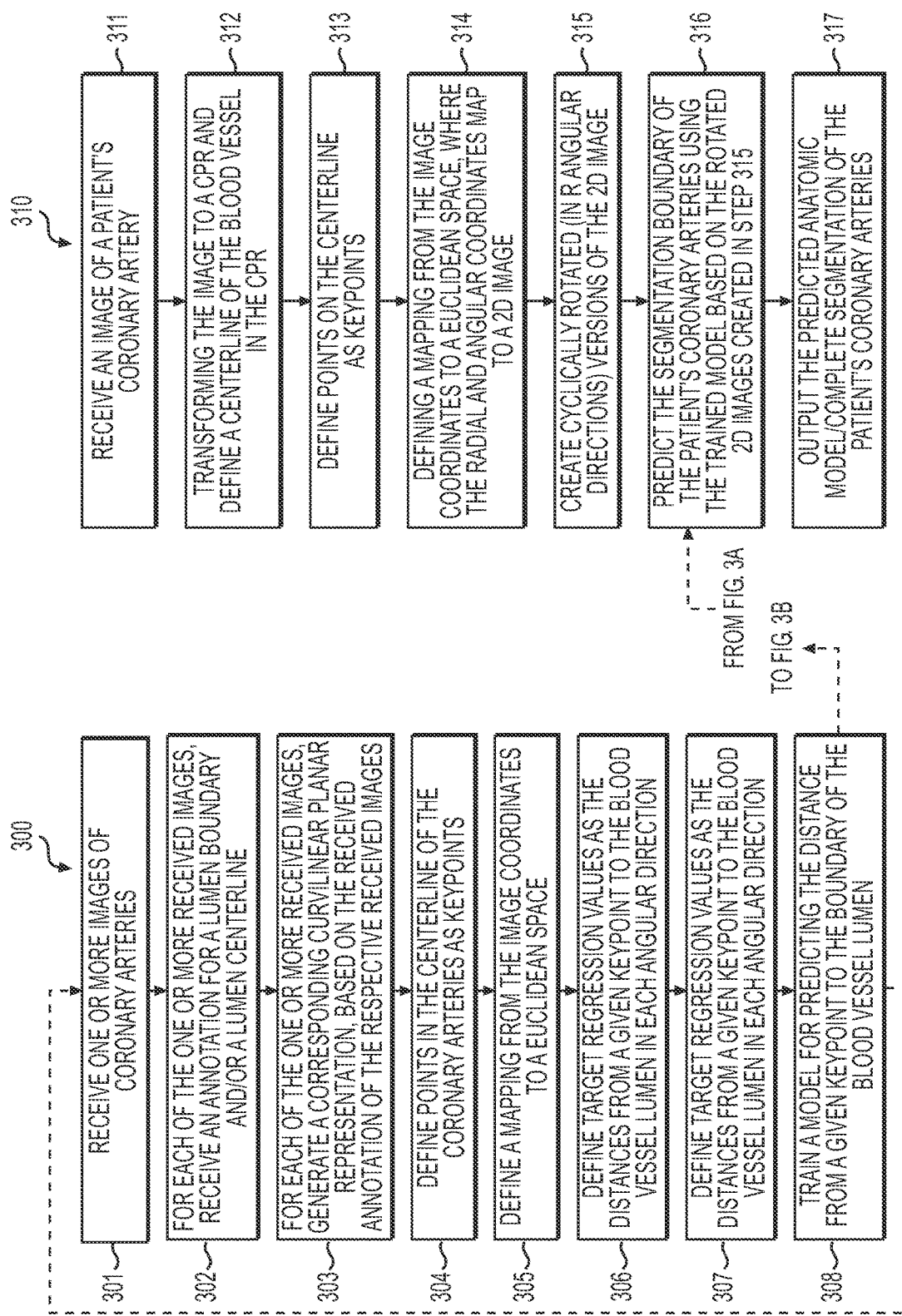

SYSTEMS AND METHODS FOR ANATOMIC STRUCTURE SEGMENTATION IN IMAGE ANALYSIS

RELATED APPLICATION

This application is a continuation of and claims the benefit of priority to U.S. application Ser. No. 17/203,964, filed Mar. 17, 2021, which is a continuation of U.S. application Ser. No. 17/013,922, filed Sep. 8, 2020, (now U.S. Pat. No. 10,984,535) which is a continuation of U.S. application Ser. No. 15/975,197, (now U.S. Pat. No. 10,803,592) filed May 9, 2018, which claims priority to U.S. Provisional Application No. 62/503,838, filed May 9, 2017, each of which are incorporated herein by reference in their entireties.

TECHNICAL FIELD

Various embodiments of the present disclosure relate generally to medical imaging and related methods. Specifically, particular embodiments of the present disclosure relate to systems and methods for anatomic structure segmentation in image analysis.

BACKGROUND

The problem of partitioning an image into multiple segments commonly occurs in computer vision and medical image analysis. A currently used approach is to automate this process using a convolutional neural network (CNN), which is trained to predict a class label for each image element (e.g., pixel or voxel). CNNs typically include multiple convolutional layers, which pass the input (e.g., an image or a portion of an image) through a set of learnable filters and nonlinear activation functions. The use of convolutional operations makes CNNs equivariant to translations. For example, translated versions of the input may lead to proportionally translated versions of the predicted segmentation labels. The set of layers with convolutions of different strides may enable CNNs to express long-range interactions in the image in terms of local, short range statistics.

The segmentation boundary of current CNNs, however, may be accurate up to the level of an image element (e.g., a pixel or a voxel). In many imaging applications, a quantization error may be introduced by placing the segmentation boundary at pixel or voxel locations. In some cases, it may be known (e.g., as a priori) that a structure of interest does not contain holes and may exist as one connected component. However, these assumptions may not be integrated into the CNN such that the predicted labels may have spurious components and holes in the segmented objects. Thus, there is a desire to build models such as CNNs that can achieve sub-pixel or sub-voxel accurate segmentations and can predict labels for single connected components without holes or disconnected structures.

The present disclosure is directed to overcoming one or more of the above-mentioned problems or interests.

SUMMARY

According to certain aspects of the present disclosure, systems and methods are disclosed for anatomic structure segmentation in image analysis. One method of anatomic structure segmentation in image analysis includes: receiving an annotation and a plurality of keypoints for an anatomic structure in one or more images; computing distances from the plurality of keypoints to a boundary of the anatomic structure; training a model, using data in the one or more images and the computed distances, for predicting a boundary in the anatomic structure in an image of a patient's anatomy; receiving the image of the patient's anatomy including the anatomic structure; estimating a segmentation boundary in the anatomic structure in the image of the patient's anatomy; and predicting, using the trained model, a boundary location in the anatomic structure in the image of the patient's anatomy by generating a regression of distances from keypoints in the anatomic structure in the image of the patient's anatomy to the estimated boundary.

According to another embodiment, a system is disclosed for anatomic structure segmentation in image analysis. The system includes a data storage device storing instructions for anatomic structure segmentation in image analysis; and a processor configured to execute the instructions to perform a method including the steps of: receiving an annotation and a plurality of keypoints for an anatomic structure in one or more images; computing distances from the plurality of keypoints to a boundary of the anatomic structure; training a model, using data in the one or more images and the computed distances, for predicting a boundary in the anatomic structure in an image of a patient's anatomy; receiving the image of the patient's anatomy including the anatomic structure; estimating a segmentation boundary in the anatomic structure in the image of the patient's anatomy; and predicting, using the trained model, a boundary location in the anatomic structure in the image of the patient's anatomy by generating a regression of distances from keypoints in the anatomic structure in the image of the patient's anatomy to the estimated boundary.

In accordance with yet another embodiment, a non-transitory computer readable medium for use on a computer system containing computer-executable programming instructions for performing a method of anatomic structure segmentation in image analysis is provided. The method includes: receiving an annotation and a plurality of keypoints for an anatomic structure in one or more images; computing distances from the plurality of keypoints to a boundary of the anatomic structure; training a model, using data in the one or more images and the computed distances, for predicting a boundary in the anatomic structure in an image of a patient's anatomy; receiving the image of the patient's anatomy including the anatomic structure; estimating a segmentation boundary in the anatomic structure in the image of the patient's anatomy; and predicting, using the trained model, a boundary location in the anatomic structure in the image of the patient's anatomy by generating a regression of distances from keypoints in the anatomic structure in the image of the patient's anatomy to the estimated boundary.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIGS. 2A and 2B are flowcharts of an exemplary method for anatomic structure segmentation in image analysis, according to an exemplary embodiment of the present disclosure.

FIGS. 3A and 3B are flowcharts of an exemplary embodiment of the method of FIGS. 2A and 2B, as applied to segmentation of coronary arteries, according to an exemplary embodiment of the present disclosure.

DESCRIPTION OF THE EMBODIMENTS

Figure 1:
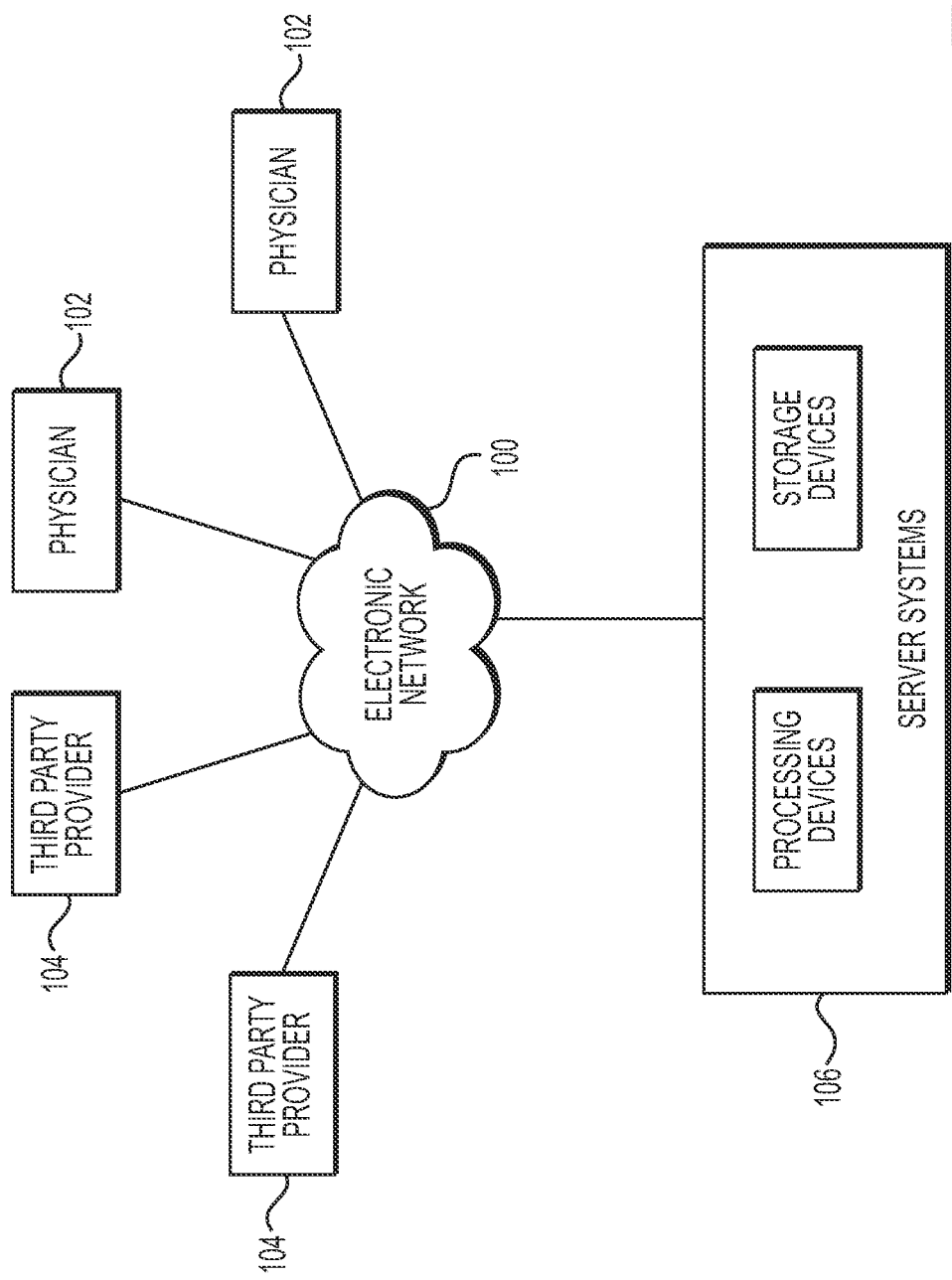
FIG. 1 is a block diagram of an exemplary system and network for anatomic structure segmentation in image analysis, according to an exemplary embodiment of the present disclosure.

Reference will now be made in detail to the exemplary embodiments of the present disclosure, examples of which are illustrated in the accompanying drawings. Wherever possible, the same reference numbers will be used throughout the drawings to refer to the same or like parts.

As described above, the accuracy of the segmentation boundaries determined by current approaches may be limited to an image element, e.g., a pixel or a voxel. In these cases, errors may be introduced by placing the segmentation boundary at voxel locations. In some cases, current prediction models may not take into account some assumptions such as that structure of interest does not contain holes or disconnected structures. Thus, there is a desire to build models that can predict segmentation boundaries with sub-pixel or sub-voxel accuracy and/or ensure important assumptions to be integrated in the model.

The present disclosure is directed to providing accurate prediction of segmentation boundary locations. In one embodiment, the present disclosure may include both a training phase and a testing (or usage) phase to estimate a segmentation boundary. One or more parameters of a learning system for developing a trained model may be optimized during the training phase. During the testing phase, an unseen or seen image can be segmented with the trained model.

For example, the disclosed systems and methods may be applied to segmenting anatomy in received image(s) of a patient of interest and determining the boundary of a structure of interests at a sub-pixel or sub-voxel level. As used herein, a boundary of a structure may include a boundary of a segment of the structure. In one embodiment, the training phase may include developing a model for predicting a distance from a keypoint in a structure of interest to a boundary of the structure of interest or a segment thereof. For example, the training phase may involve receiving a plurality of keypoints with known locations in the structure of interest and computing the distances from the keypoints to a boundary of the structure of interest of a segment thereof (e.g., based on the known locations). Then a model (e.g., a CNN model) may be trained based on the locations of the keypoints, the computed distances, and/or the data in the received images. The trained model may regress a sample distance or predict an indirect representation of the sample distance. The regression from the trained model may be a continuous value, thus allowing for predicting boundary locations based on the regressed distance with sub-pixel or sub-voxel accuracy.

In one embodiment, a testing phase may include receiving images of a patient's anatomy. The patient may be a patient of interest, e.g., a patient desiring a diagnostic test. The testing phase may involve estimating a boundary of a structure of interest based on one or more images of the patient's anatomy and predict the boundary locations by regressing the distances from keypoints in the structure of interest to the estimated boundary using the model developed from the training phase.

As used herein, the term "exemplary" is used in the sense of "example," rather than "ideal." Although this exemplary embodiment is written in the context of medical image analysis, the present disclosure may equally apply to any non-medical image analysis or computer vision evaluation.

Referring now to the figures, FIG. 1 depicts a block diagram of an exemplary environment of a system and network for anatomic structure segmentation in image analysis. Specifically, FIG. 1 depicts a plurality of physicians 102 and third party providers 104, any of whom may be connected to an electronic network 100, such as the Internet, through one or more computers, servers, and/or handheld mobile devices. Physicians 102 and/or third party providers 104 may create or otherwise obtain images of one or more patients' cardiac, vascular, and/or organ systems. The physicians 102 and/or third party providers 104 may also obtain any combination of patient-specific information, such as age, medical history, blood pressure, blood viscosity, etc. Physicians 102 and/or third party providers 104 may transmit the cardiac/vascular/organ images and/or patient-specific information to server systems 106 over the electronic network 100. Server systems 106 may include storage devices for storing images and data received from physicians 102 and/or third party providers 104. Server systems 106 may also include processing devices for processing images and data stored in the storage devices. Alternatively or in addition, the anatomic structure segmentation of the present disclosure (or portions of the system and methods of the present disclosure) may be performed on a local processing device (e.g., a laptop), absent an external server or network.

FIGS. 2A and 2B describe exemplary methods for performing anatomic structure segmentation using a learning system. FIGS. 3A and 3B are directed to specific embodiments or applications of the methods discussed in FIGS. 2A and 2B. For example, FIG. 3A and FIG. 3B describe an embodiment for the segmentation of blood vessels using a learning system. All of the methods may be performed by server systems 106, based on information, images, and data received from physicians 102 and/or third party providers 104 over electronic network 100.

FIGS. 2A and 2B describe exemplary methods for anatomic structure segmentation in image analysis. In one embodiment, the anatomic structure segmentation may include two phases: a training phase and a testing phase. The training phase may involve training a learning system (e.g., a deep learning system) to predict a boundary location of a structure of interest or a segment thereof with sub-pixel or sub-voxel accuracy. The testing phase may include predicting a boundary location of the structure of interest or a segment thereof in a newly received image.

FIG. 2A is a flowchart of an exemplary training phase method 200 for training a learning system (e.g., a deep learning system) to predict a boundary location, according to various embodiments. Method 200 may provide the basis for a testing phase in method 210 of FIG. 2B, for anatomic structure segmentation of an imaged structure of interest of a specific patient. Method 200 may include one or more of steps 201-207 shown in FIG. 2A. In some embodiments, method 200 may include repeating one or more of steps 201-207, e.g., repeating steps 201 through 207, for one or more times.

In some embodiments, step 201 of method 200 may include receiving one or more images and/or image data in an electronic storage medium (e.g., hard drive, network drive, cloud drive, mobile phone, tablet, database, etc.). In a medical context, these images may, for instance, be from a medical imaging device, e.g., computed tomography (CT), positron emission tomography (PET), single-photon emission computerized tomography (SPECT), magnetic resonance imaging (MRI), microscope, ultrasound, (multi-view) angiography, etc. In one embodiment, multiple images for a single patient may be used. In a further embodiment, the images may comprise a structure of a patient's anatomy. In other embodiments, the images may be of numerous individuals having similar anatomical features or numerous individuals having different anatomical features. In a non-medical context, these images may be from any source, e.g., a camera, satellite, radar, lidar, sonar, telescope, microscope, etc. In the following disclosure, images received in step 201 may be referred to as "training images."

In some embodiments, step 202 may include receiving an annotation for one or more structures of interest in one or more of the training images. In some cases, one or more of the training images may include a structure of interest, e.g., an anatomic structure of the patient. In one example, all of the training images may include the structure of interest. In one embodiment, all training images may be annotated. This type of embodiment may be referred to as "supervised learning." Another embodiment may include only a subset of the training images with annotations. This type of scenario may be referred to as "semi-supervised learning." In one embodiment, the structures of interest may include a blood vessel or tissue of the patient. In such a case, annotation(s) may include labels for vessel names (e.g., right coronary artery (RCA), left anterior descending artery (LAD), left circumflex artery (LCX), etc.), vessel landmarks (e.g., aortic valve point, ostia points, bifurcations, etc.), estimated vessel location, flags (e.g., noted portions where imaging is ambiguous or boundaries or unclear), etc. In some embodiments, the annotation(s) may be in various formats, including, but not limited to, meshes, voxels, implicit surface representations, or point clouds.

In some embodiments, step 203 may include receiving a plurality of keypoints in the structure of interest. The locations of the keypoints in the structure of interest may be known (e.g., based on the annotation for the structure of interest and/or data in the received images). For example, one or more of the keypoints may be known to be inside the structure of interest, on the boundary of the structure of interest, or close to the boundary of the structure of interest. In some embodiments, the boundary location (e.g., rough boundary location) of the structure of interest and/or the locations of the keypoints may be determined, and/or the keypoints with known locations in the structure of interest may be retrieved, by fitting a shape model to the structure of interest.

In some embodiments, step 204 may include defining a mapping from the image coordinates in the training images to a Euclidean space. The image coordinates may be continuous. The image coordinates may be the intersection points of the 3D structure of interest and/or the rays. The image coordinates may be in rays in the Euclidean space. There may be one of the key points received in step 203 on each of the rays.

In one embodiment, a given keypoint may be known to be inside the structure of interest. In such as a scenario, step 204 may include formulating a mapping in polar form with the given keypoint at the center. In this setting, the image coordinates along equally long rays in equiangular directions that originate from the keypoint may be chosen.

As another scenario, the mapping in step 204 may include a mapping from multiple polar dimensions to a Euclidean space. For example, it may be possible to sample from a spherical coordinate system to parameterize a structure of interest (e.g., a 3-dimensional (3D) structure of interest). In this embodiment, two cyclic dimensions may map to three Euclidean dimensions given by the distance along the ray and the two dimensions that are associated with the two cyclic dimensions.

As another scenario, the mapping in step 204 may include a mapping from polar form in one dimension and linear form in one or more additional dimensions to a Euclidean space. For example, a tube like structure may be represented by landmark points on a sequence of closed curves. The closed curves may then be represented in polar form, whereas the direction along the tube may be linear. Thus, this mapping may amount to a three dimensional Euclidean space, where the first dimension represents the distance along the sampled ray, the second dimension represents the cyclic dimension, and the third dimension represents the linear dimension along the tube.

In one embodiment, a set of keypoints close to the image surface may be received in step 203. For example, the set of keypoints may be arranged along a set of closed curves on a given 3D mesh or a 3D implicit representation. Then, step 204 may include defining a set of equally long rays that each includes a keypoint and is directed perpendicular to the 3D mesh, and refining the boundary of the structure of interest may. Then when mapping to a Euclidean space in step 204, the distance along the defined ray may represent one of the Euclidean dimensions, whereas the keypoints on the closed curve may represent the second dimension.

In some embodiments, step 205 may include, for each of the ray mapped in step 204, computing a distance from the keypoint on the ray to the boundary of the structure of interest. The computed distances may be the target values of the learning system.

In some embodiments, step 206 may include, for each target value, determining image intensities along the rays defined in step 204. The defined rays are associated with keypoints on the rays and are thus associated with the target values. Step 206 may further include ensuring that the rays associated with target values are at fixed locations. For example, a first ray associated with a first target value may be at a first location that is fixed. The other rays associated with other target values may have a coordinate relative to the first ray, thus the locations of these other rays may be fixed as well based the location of the first ray. In one embodiment, the input for each of the target value distances may be cyclic transformations of each other.

In some embodiments, step 207 may include training a model (e.g., a CNN model) for predicting the segmentation boundary location of the structure of interest in a newly received image. For example, the model may be trained to predict the distance from a keypoint to the segmentation boundary of the structure of interest. In one embodiment, the model may be trained for regressing the distance. The regression value may be continuous so that the boundary location may be predicted with sub-pixel or sub-voxel accuracy. In certain embodiments, the model may be trained for predicting an indirect representation of the distance. For example, the model may quantize the ray into a plurality of small bins and/or may predict the bin that represents the distance.

FIG. 2B is a block diagram of an exemplary testing phase (or usage phase) method 210 for predicting a boundary of a segmentation of a structure of interest in a specific patient image, according to an exemplary embodiment of the present disclosure. Method 210 may include one or more of steps 211-215. In one embodiment, the boundary of the segmentation may be predicted using a trained model (e.g., from method 200).

In some embodiments, step 211 may include receiving one or more images from a patient in an electronic storage medium (e.g., hard drive, network drive, cloud drive, mobile phone, tablet, database, etc.). In one embodiment, the images may include medical images, e.g., images may be from any medical imaging device, e.g., CT, MR, SPECT, PET, microscope, ultrasound, (multi-view) angiography, etc. In one embodiment, training images (e.g., of method 200) may include images acquired from one patient, and step 211 may include receiving images also of that one patient. Alternately or additionally, step 211 may include receiving one or more images from a non-medical imaging device, e.g., a camera, satellite, radar, lidar, sonar, telescope, microscope, etc. In the following steps, images received during step 211 may be referred to as "testing images."

In some embodiments, step 212 may include estimating a segmentation boundary of the structure of interest, or the location or boundary of another object in the testing images (e.g., an object different from the structure of interest). The estimated boundary or the location or boundary of another object may be used to initialize an automated segmentation system (e.g., centerlines). A set of keypoints may be retrieved from this initial segment. In one embodiment, the set of keypoints may include a keypoint inside the structure of interest.

In some embodiments, step 213 may include defining a mapping from the image coordinates in the testing images to a Euclidean space. The image coordinates may be continuous. The image coordinates may be in rays in the Euclidean space. There may be a keypoint (e.g., one of the keypoints retrieved in step 202) on each of the rays may include a keypoint. In one embodiment, the input of this mapping may be analogous to the input in the mapping in step 204.

In some embodiments, step 214 may include predicting, using the model trained by method 200, the boundary in the structure of interest. In one embodiment, the predicting may include regressing the distance from the keypoint on the rays defined in step 213 to the estimated boundary. In some cases, the regression may be a continuous value, and thus the boundary may be predicted with sub-pixel or sub-voxel accuracy. In one embodiment, step 214 may further include obtaining a surface from the predicted boundary (e.g., boundary point cloud). The surface may be obtained using a surface reconstruction method, such as Poisson surface reconstruction.

In some embodiments, step 215 may include outputting the predicted boundary (e.g., the complete segmentation boundary) of the structure of interest to an electronic storage medium (e.g., hard drive, network drive, cloud drive, mobile phone, tablet, database, etc.). Step 215 may further include displaying the output result on an interface.

FIGS. 3A and 3B are directed to specific embodiments or applications of the exemplary methods discussed in FIGS. 2A and 2B. For example, FIG. 3A and FIG. 3B, respectively, describe an exemplary training phase and testing phase for segmentation of coronary arteries in image analysis.

The accuracy of patient-specific segmentation of blood vessels, e.g., coronary arteries, may affect medical assessments such as blood flow simulation or calculation of geometric characteristics of blood vessels. If the accuracy of the segmentation is not sufficient, e.g., limited to the level of an image element (e.g., a pixel or a voxel), the medical assessments may generate spurious results. FIGS. 3A and 3B show exemplary methods for segmentation of coronary arteries with sub-pixel or sub-voxel accuracy. Although coronary arteries are used in the exemplary methods herein, the methods illustrated in FIGS. 3A and 3B may also be used for segmentation of other types of blood vessels or anatomic structures other than blood vessels.

FIG. 3A is a flowchart of an exemplary method 300 for a training phase designed to provide the basis for sub-voxel segmentation of coronary arteries, according to various embodiments. Method 300 may include one or more of steps 301-308 shown in FIG. 3A. In some embodiments, method 200 may include repeating one or more of steps 301-308, e.g., repeating steps 301 through 308, for one or more times.

In some embodiments, step 301 may include receiving one or more images of coronary arteries in an electronic storage medium (e.g., hard drive, network drive, cloud drive, mobile phone, tablet, database, etc.). These images may be from a medical imaging device, such as CT, MR, SPECT, PET, ultrasound, (multi-view) angiography, etc. These images may be referred to as "training images."

In some embodiments, step 302 may include receiving annotations for the coronary arteries in one or more of the training images. For examples, the annotations may include vessel lumen boundary and/or the vessel lumen centerline(s). In one embodiment, step 303 may include receiving or generating a geometric mesh of the coronary vessels represented in the received images. The geometric mesh may be specified as a set of vertices and edges. Alternately or additionally, step 303 may include receiving a centerline of the coronary vessels. The centerline may also be represented as a set of vertices that may be connected by edges.

In some embodiments, step 303 may include transforming the training image data (e.g., the geometric mesh, vertices, edges, centerline, etc.) into a curvilinear planar representation (CPR). The transformation may allow simplification of the blood vessel segmentation process. For example, a set of planes (e.g., frames) may be extracted along the centerline (e.g., orthogonal to the centerline) to constitute a 3D volume. In one embodiment, the 3D volume may comprise a CPR, with a coordinate system frame of reference defining two dimensions and the centerline length defining a third dimension. In one embodiment, the curvilinear planar representation may eliminate degrees of freedom (e.g., the curvature of the centerline), which may not be relevant for predicting one or more parameters of the coronary vessels. For example, the curvature of the centerline may be irrelevant for determining a parameter related to the location of the coronary vessels' lumen boundary.

In some embodiments, step 304 may include defining keypoints based on the image data. For example, step 304 may include defining points on the centerline of the coronary arteries as keypoints. Such defined keypoints may be assumed to be inside the blood vessel. These keypoints may not necessarily be centered. In some cases, nevertheless, these keypoints may, by construction, be in the center of each frame.

In some embodiments, step 305 may include, for each frame, defining a mapping from the image coordinates in the testing images to a Euclidean space. In one embodiment, the mapping may be defined using polar sampling within the frame. In certain embodiments, defining the mapping may include determining CPR intensity values in a set of angular directions around a keypoint defined in step 304. The determined CPR intensity value may be arranged, e.g., so that the radial and angular coordinates map to a 2-dimensional (2D) image. For example, a discrete set of samples specified by a radial and an angular component of the frame may be mapped to the row and the column of a 2D image that indexes the radial and the angular component. Each row of the CPR intensity values may be defined as a radial coordinate and each column of the CPR intensity values may be defined as an angular coordinate.

In some embodiments, step 306 may include defining target regression values. The target regression values may be defined as the distances from a given keypoint to the boundary of the blood vessel lumen in each angular direction. In one embodiment, step 306 may include defining target regression values in r angular directions. For example, for a given target distance value in an r angular direction, the 2D image created in step 305 may be cyclically rotated so that the column associated with the r angular direction that is associated with the given target regression value is the first column. For example, when predicting all r target values, of which each is associated with a different column of an input image, the columns may be cyclically rotated. If the image is rotated by r columns, the r-th column becomes the first column and the same model that is used to predict the target value for the first column may be applied for the target value of r-th column that is in the first column after the cyclic rotation.

In some embodiments, step 307 may include training a model (e.g., a CNN model) for predicting the distance from a given keypoint to the boundary of the blood vessel lumen. In one embodiment, the trained model may predict the mapping from each of the 2D images created in step 305 to the associated target distance value. The loss function may be specified to minimize the mean squared error between the predicted and the target distance. As used herein, a loss function may specify the error between the prediction and the target value, and is an integral part of an objective function that is optimized to learn the suitable model parameters. For example, a loss function may be a mean squared error, e.g., the mean of the squares of the difference between the prediction and the target value.

FIG. 3B is a block diagram of an exemplary method 310 for a testing phase that may provide a sub-voxel segmentation of a patient's blood vessels (e.g., coronary arteries), according to one embodiment. In some embodiments, step 311 may include receiving image data of a patient's coronary artery in an electronic storage medium (e.g., hard drive, network drive, cloud drive, mobile phone, tablet, database, etc.).

In some embodiments, step 312 may include receiving a prediction of the centerline of the blood vessels using, for example, a centerline detection algorithm. In one embodiment, step 312 may include transforming the received image or image data into a CPR. The transformation may allow simplification of the blood vessel segmentation process. For example, a set of planes (e.g., frames) may be extracted along the centerline (e.g., orthogonal to the centerline) of the blood vessel lumen to constitute a 3D volume (e.g., CPR). In one embodiment, the 3D volume may comprise a CPR, with a coordinate system frame of reference defining two dimensions and the centerline length defining a third dimension. The transformation parameters (e.g., translation, scale, rotation) may be stored.

In some embodiments, step 313 may include defining points on the centerline of the blood vessels as keypoints.

In some embodiments, step 314 may include, for each of the frame defined in step 312, defining a mapping of the image coordinates in the patient's image to a Euclidean space. For example, the mapping may be defined using polar sampling within the frame. This step may be analogous to one or more steps in method 300.

In some embodiments, step 315 may include determining CPR intensity values in a set of angular directions around a keypoint defined in step 313. The determined CPR intensity value may be arranged so that the radial and angular coordinates map to a 2-dimensional (2D) image. The 2D image may be cyclically rotated so that the column associated with the r angular direction that is associated with the given target distance value is the first column. Step 315 may further include creating cyclically rotated (in r angular directions) versions of the 2D image.

In some embodiments, step 316 may include predicting the segmentation boundary of the patient's coronary arteries using the model trained in method 300. In one embodiment, step 316 may include predicting the distance associated with the first column in each of the rotated images created in step 315, thus predicting landmark points of the boundary in CPR representation. In one embodiment, step 316 may include generating an anatomic model of the patient's imaged coronary artery. The anatomic model may include a final lumen segmentation with a sub-pixel or sub-voxel accuracy. For example, step 317 may include transforming the predicted landmark point(s) from the CPR representation to the original 3D image space. The orientation and position of each frame along the centerline may be determined from the creation of a CPR. For example, the orientation and position may be determined and stored in step 312. In one embodiment, the 3D points may be computed from the CPR, and any 3D surface reconstruction method (e.g., Poisson surface reconstruction) may be applied to the point cloud of the landmark point(s) to construct the anatomic model or final lumen segmentation of the patient's coronary arteries.

In some embodiments, step 317 may include outputting the anatomic model and/or the complete segmentation boundary of the blood vessels to an electronic storage medium (e.g., hard drive, network drive, cloud drive, mobile phone, tablet, database, etc.) and/or display.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method of machine-learning based anatomic structure segmentation in image analysis, the method comprising:
   receiving image data of an anatomic structure of a patient;
   obtaining an annotation of the anatomic structure;
   determining, based on the annotation, one or more keypoints;
   determining a respective distance between each keypoint and a boundary of the anatomic structure;
   determining respective intensities along a respective ray associated with each keypoint;
   training a patient-specific Convolutional Neural Network (CNN), based on the respective distance and the respective intensities of each keypoint, to predict sub-pixel or sub-voxel locations of the boundary of the anatomic structure; and generating, using the trained patient-specific CNN a sub-pixel or sub-voxel boundary of the anatomic structure.

2. The computer-implemented method of claim 1, wherein the generated sub-pixel or sub-voxel boundary of the anatomic structure is a continuous boundary.

3. The computer-implemented method of claim 1, wherein the image data includes a plurality of successive frames that are orthogonal to a centerline of the anatomic structure.

4. The computer-implemented method of claim 3, wherein generating the sub-pixel or sub-voxel boundary of the anatomic structure includes generating a respective boundary portion for each frame of the plurality of successive frames.

5. The computer-implemented method of claim 4, wherein generating the sub-pixel or sub-voxel boundary of the anatomic structure further includes generating a continuous three-dimensional surface of the anatomic structure based on the respective boundary portions.

6. The computer-implemented method of claim 3, wherein the annotation includes an identification, in each frame of the plurality of successive frames, of the centerline of the anatomic structure.

7. The computer-implemented method of claim 1, wherein the anatomic structure includes a blood vessel.

8. A system for performing machine-learning based anatomic structure segmentation in image analysis, comprising:
   at least one memory storing instructions and a Convolutional Neural Network (CNN); and
   at least one processor operatively connected to the at least one memory and configured to execute the instructions to perform operations, including:
      receiving image data of an anatomic structure of a patient;
      obtaining an annotation of the anatomic structure;
      determining, based on the annotation, one or more keypoints;
      determining a respective distance between each keypoint and a boundary of the anatomic structure;
      determining respective intensities along a respective ray associated with each keypoint;
      training the CNN, based on the respective distance and the respective intensities of each keypoint, to be patient-specific and to predict sub-pixel or sub-voxel locations of the boundary of the anatomic structure; and
      generating, using the trained patient-specific CNN a sub-pixel or sub-voxel boundary of the anatomic structure.

9. The system of claim 8, wherein the generated sub-pixel or sub-voxel boundary of the anatomic structure is a continuous boundary.

10. The system of claim 8, wherein the image data includes a plurality of successive frames that are orthogonal to a centerline of the anatomic structure.

11. The system of claim 10, wherein generating the sub-pixel or sub-voxel boundary of the anatomic structure includes generating a respective boundary portion for each frame of the plurality of successive frames.

12. The system of claim 11, wherein generating the sub-pixel or sub-voxel boundary of the anatomic structure further includes generating a continuous three-dimensional surface of the anatomic structure based on the respective boundary portions.

13. The system of claim 10, wherein the annotation includes an identification, in each frame of the plurality of successive frames, of the centerline of the anatomic structure.

14. The system of claim 8, wherein the anatomic structure includes a blood vessel.

15. A non-transitory computer-readable medium comprising instructions for machine-learning based anatomic structure segmentation in image analysis, the instructions executable by one or more processors to perform operations, including:
   receiving image data of an anatomic structure of a patient;
   obtaining an annotation of the anatomic structure;
   determining, based on the annotation, one or more keypoints;
   determining a respective distance between each keypoint and a boundary of the anatomic structure;
   determining respective intensities along a respective ray associated with each keypoint;
   training a patient-specific Convolutional Neural Network (CNN), based on the respective distance and the respective intensities of each keypoint, to predict sub-pixel or sub-voxel locations of the boundary of the anatomic structure; and
   generating, using the trained patient-specific CNN a sub-pixel or sub-voxel boundary of the anatomic structure.

16. The non-transitory computer-readable medium of claim 15, wherein the generated sub-pixel or sub-voxel boundary of the anatomic structure is a continuous boundary.

17. The non-transitory computer-readable medium of claim 15, wherein the image data includes a plurality of successive frames that are orthogonal to a centerline of the anatomic structure.

18. The non-transitory computer-readable medium of claim 17, wherein generating the sub-pixel or sub-voxel boundary of the anatomic structure includes:
   generating a respective boundary portion for each frame of the plurality of successive frames; and
   generating a continuous three-dimensional surface of the anatomic structure based on the respective boundary portions.

19. The non-transitory computer-readable medium of claim 17, wherein the annotation includes an identification, in each frame of the plurality of successive frames, of the centerline of the anatomic structure.

20. The non-transitory computer-readable medium of claim 15, wherein the anatomic structure includes a blood vessel.

* * * * *